United States Patent
Brambilla et al.

(10) Patent No.: US 9,017,634 B2
(45) Date of Patent: Apr. 28, 2015

(54) IN-LINE MANUFACTURE OF CARBON NANOTUBES

(75) Inventors: Nicolò Michele Brambilla, Boston, MA (US); Riccardo Signorelli, Boston, MA (US); Fabrizio Martini, Boston, MA (US); Oscar Enrique Corripio Luna, Jamaica Plain, MA (US)

(73) Assignee: FastCAP Systems Corporation, Boston, MA (US)

( * ) Notice: Subject to any disclaimer, the term of this patent is extended or adjusted under 35 U.S.C. 154(b) by 0 days.

(21) Appl. No.: 13/588,452

(22) Filed: Aug. 17, 2012

(65) Prior Publication Data

US 2013/0045157 A1 Feb. 21, 2013

Related U.S. Application Data

(60) Provisional application No. 61/525,326, filed on Aug. 19, 2011, provisional application No. 61/568,450, filed on Dec. 8, 2011.

(51) Int. Cl.
| | |
|---|---|
| *C01B 31/02* | (2006.01) |
| *B01J 19/22* | (2006.01) |
| *B82Y 40/00* | (2011.01) |
| *B82Y 30/00* | (2011.01) |

(52) U.S. Cl.
CPC .............. *B01J 19/22* (2013.01); *C01B 31/0226* (2013.01); *B82Y 40/00* (2013.01); *B82Y 30/00* (2013.01); *C01B 2202/08* (2013.01); *B01J 2219/0879* (2013.01); *B01J 2219/0892* (2013.01); *B01J 2219/0894* (2013.01); *Y10S 977/742* (2013.01); *Y10S 977/843* (2013.01)

(58) Field of Classification Search
USPC .............. 423/447.1, 447.3; 977/742, 842, 843
See application file for complete search history.

(56) References Cited

U.S. PATENT DOCUMENTS

| | | |
|---|---|---|
| 5,441,827 A | 8/1995 | Gratzel et al. |
| 6,205,016 B1 | 3/2001 | Niu |
| 6,232,706 B1 | 5/2001 | Dai et al. |
| 6,350,488 B1 | 2/2002 | Lee et al. |
| 6,444,326 B1 | 9/2002 | Smith |
| 6,454,816 B1 | 9/2002 | Lee et al. |
| 6,511,760 B1 | 1/2003 | Barone et al. |
| 6,514,113 B1 | 2/2003 | Lee et al. |
| 6,665,169 B2 | 12/2003 | Tennent et al. |
| 6,764,874 B1 | 7/2004 | Zhang et al. |

(Continued)

FOREIGN PATENT DOCUMENTS

| | | |
|---|---|---|
| WO | WO2008016990 A2 | 2/2008 |
| WO | WO 2009128343 A1 * | 10/2009 |

OTHER PUBLICATIONS

International Search Report from PCT/US2007/068314, mailed Feb. 13, 2008.

(Continued)

*Primary Examiner* — Richard M Rump
(74) *Attorney, Agent, or Firm* — Wolf, Greenfield & Sacks, P.C.

(57) ABSTRACT

Mass production of carbon nanotubes (CNT) are facilitated by methods and apparatus disclosed herein. Advantageously, the methods and apparatus make use of a single production unit, and therefore provide for uninterrupted progress in a fabrication process. Embodiments of control systems for a variety of CNT production apparatus are included.

17 Claims, 2 Drawing Sheets

(56) References Cited

U.S. PATENT DOCUMENTS

| | | | |
|---|---|---|---|
| 6,872,681 | B2 | 3/2005 | Niu et al. |
| 6,906,911 | B2 | 6/2005 | Ikeda et al. |
| 6,962,823 | B2 | 11/2005 | Empedocles et al. |
| 7,070,833 | B2 | 7/2006 | Smith et al. |
| 7,126,207 | B2 | 10/2006 | Mosley et al. |
| 7,201,627 | B2 | 4/2007 | Ohnuma |
| 7,327,556 | B2 | 2/2008 | Ro et al. |
| 7,335,395 | B2 | 2/2008 | Ward et al. |
| 7,381,367 | B1 | 6/2008 | Baker et al. |
| 7,897,209 | B2 | 3/2011 | Shibuya et al. |
| 8,025,971 | B2 * | 9/2011 | Maeno et al. ............ 428/398 |
| 2002/0159943 | A1 | 10/2002 | Colbert et al. |
| 2004/0131937 | A1 | 7/2004 | Chen et al. |
| 2005/0230270 | A1 | 10/2005 | Ren et al. |
| 2005/0238810 | A1 | 10/2005 | Scaringe et al. |
| 2007/0076349 | A1 | 4/2007 | Dementiev et al. |
| 2007/0258192 | A1 | 11/2007 | Schindall et al. |
| 2008/0090183 | A1 | 4/2008 | Zhu et al. |
| 2009/0294753 | A1 | 12/2009 | Hauge et al. |
| 2010/0062229 | A1 | 3/2010 | Hata et al. |
| 2010/0196600 | A1 * | 8/2010 | Shibuya et al. ......... 427/249.1 |

OTHER PUBLICATIONS

Written Opinion of the International Searching Authority from PCT/US2007/068314, mailed Feb. 13, 2008.

An, et al., "Supercapacitors Using Single-Walled Carbon Nanotube Electrodes", Advanced Materials, Apr. 2001, pp. 497-500, vol. 13, No. 7.

Halber, "Researchers Fired Up Over New Battery", The Tech, Feb. 8, 2006, pp. 1, 5, vol. 50, No. 16.

Wongwiriyapan, et al., "Direct Growth of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.

Robertson, "Realistic applications of CNTs", materialstoday, Oct. 2004, pp. 46-52, vol. 7, No. 10.

Signorelli, et al., "Nanotube Enhanced Ultracapacitor," 14th International Seminar on Double Layer Capacitors and Hybrid Energy Storage Devices, Dec. 6-8, 2004, pp. 49-61.

Signorelli, et al., "Nanotube Enhanced Ultracapacitor," 15th International Seminar on Double Layer Capacitors and Hybrid Energy Storage Devices, Dec. 5-7, 2005, pp. 158-168.

Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.

Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.

Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.

Signorelli, et al., "Carbon Nanotube Enhanced Ultracapacitor", Sep. 2004.

Emmenegger, et al., "Investigation of Electrochemical Double-layer (ECDL) Capacitors Electrodes Based on Carbon Nanotubes and Activated Carbon Materials," J. of Power Sources, 2003, pp. 321-329, vol. 124.

Hyeok, et al., "Electrochemical Properties of High-Power Supercapacitors Using Single-Walled Carbon Nanotube Electrodes," Adv. Funct. Mater., Oct. 2001, 387-392, vol. 11, No. 5.

Murakami, et al., "Growth of Vertically Aligned Single-walled Carbon Nanotube Films on Quartz Substrates and Their Optical Anisotropy," Chem. Phys. Lett., 2004, pp. 298-303, vol. 385.

Niu, et al., "High Power Electrochemical Capacitors Based on Carbon Nanotube Electrodes," Appl. Phys. Lett., Mar. 17, 1997, pp. 1480-1482, vol. 70, No. 11.

\* cited by examiner

IN-LINE MANUFACTURE OF CARBON NANOTUBES

STATEMENT OF FEDERALLY SPONSORED RESEARCH

This invention was made with government support under grant DE-AR0000035/0001 awarded by the Unites States Department of Energy (ARPA-E). The United States government has certain rights in the invention.

BACKGROUND OF THE INVENTION

1. Field of the Invention

The present invention relates to producing aligned carbon-nanotube aggregates and, in particular, to methods and apparatus for producing carbon-nanotube aggregates.

2. Description of the Related Art

Carbon nanotubes (hereinafter referred to also as "CNT" or "CNTs") are carbon structures that exhibit a variety of properties. Many of the properties suggest opportunities for improvements in a variety of technology areas. These technology areas include electronic device materials, optical materials as well as conducting and other materials.

A known method for producing such CNTs is a chemical vapor deposition method (hereinafter referred to also as a "CVD method"). Prior art CVD methods involve preparing a catalyst with a reducing gas (to eliminate oxidation), then bringing a carbon-containing gas (hereinafter referred to as "raw material gas") into contact with a catalyst, (i.e., fine metal particles in a hot atmosphere of approximately 500 degrees Celsius to 1,000 degrees Celsius). This results in CNTs with variations in aspects such as the type and arrangement. The CVD method has been used to produce both single-walled carbon nanotubes (SWCNTs) and multiwall carbon nanotubes (MWCNTs), and is capable of producing a large number of CNTs aligned perpendicularly to a surface of the substrate.

One attempt to scale production of CNTs has been provided in U.S. Pat. No. 7,897,209, entitled "Apparatus and Method for Producing Aligned Carbon-Nanotube Aggregates." The unit disclosed therein provides for mass production of CNT. However, as the formation unit and the growth unit are provided separately, a reducing environment is used, and for other reasons, the process therein is complicated and requires additional handling. In short, there is room for improvement.

Thus, what are needed are methods and apparatus for production of carbon nanotubes in a high throughput environment. Preferably, the methods and apparatus offer reduced cost of manufacture, as well as an improved rate of production.

BRIEF SUMMARY OF THE INVENTION

Mass production of carbon nanotubes (CNT) are facilitated by methods and apparatus disclosed herein. Advantageously, the methods and apparatus make use of a single production unit, and therefore provide for uninterrupted progress in a fabrication process. A control system for a CNT production apparatus is included.

BRIEF DESCRIPTION OF DRAWINGS

The foregoing and other features and advantages of the invention are apparent from the following detailed description taken in conjunction with the accompanying drawings in which.

DETAILED DESCRIPTION OF THE INVENTION

Disclosed are methods and apparatus for providing aggregates of carbon nanotubes (CNT). The techniques disclosed provide for a high degree of control over fabrication processes, and thus result in CNT that may be well adapted (i.e., designed for) specific applications. As an overview, a base material is provided. A catalyst material is then disposed upon the base material, and a carbonaceous material is deposited onto the catalyst. As fabrication occurs in a substantially oxygen free environment, problems associated with oxidation and a need for reduction are avoided. When practicing the various aspects of the techniques disclosed herein, manufacturers of CNT will realize efficient processes for production of high quality CNT.

The techniques disclosed herein may be adjusted as necessary to provide CNT having desired properties. That is, the processes may be controlled with regard for favoring properties such as density, surface area, length, a number of walls, composition (i.e., metallic or non-metallic), end properties (i.e., open end or closed end) and the like.

Figure 1:
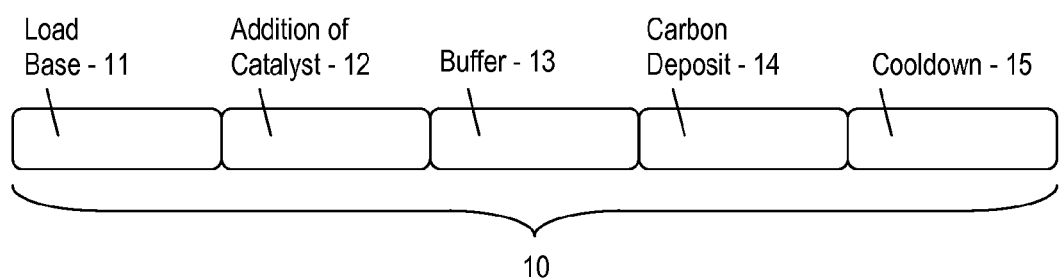
FIG. 1 is a block diagram schematically showing an embodiment of a functional configuration of a production apparatus.

Reference may be had to FIG. 1 for an overview of an exemplary embodiment. In FIG. 1, non-limiting aspects of a process for fabrication 10 of CNT are provided. In this embodiment, the process for fabrication 10 includes a first step 11 where base material is loaded into a fabricator (also referred to as a "production apparatus" and by other similar terms). In a second step 12, a layer of a catalyst is applied to the base material. In a third step 13, carbonaceous material is progressively deposited onto the catalyst layer and the CNT are grown. In a fourth step 14, the CNT are cooled for offloading and subsequent use.

An exemplary apparatus is provided for mass production of the CNT. In various embodiments, the apparatus is arranged to provide rigorous environmental controls (e.g., control over temperature, atmospheric content and/or pressure, etc., . . . ). In general, the CNT product is produced in an ongoing (i.e., uninterrupted or continuous) process. By controlling the production environment throughout the process, and by varying aspects of the production environment as needed during the process, it is possible to produce CNT that exhibit desired properties.

As one might imagine, the process requires considerable equipment and controls and therefore that the description of these four steps is an oversimplification. In order to provide some context for greater explanation of each step (11-14), as well as additional embodiments, some definitions, parameters, properties and such are now presented.

A machine that is referred to as a "production apparatus," "fabricator" or by any other similar term or terms herein generally includes components as necessary or desired for fabrication of the CNT. Exemplary components that are included in the production apparatus include components as necessary to perform described functions. Exemplary and non-limiting examples of components that may be included include at least one pump, valve, electrical conduit, gas conduit, power supply, gas supply (including supplies of inert gas, carbonaceous gas and the like), water supply, nozzle, intake, outlet, vent, exhaust, fan, material moving apparatus (such as a conveyer belt, drive system and the like), heating element (such as a resistive heating element), heat exchanger (or other form of refrigeration), shutter, door, servo, motor, sensor (electrical, temperature, pressure, gas, optical, etc., . . . ), transducer, controller, human interface, computer interface, processor, data storage, memory, bus, computer executable code for governing operation of the machine, and others as may be needed by a machine operator, manufacturer or designer. In short, the various technologies that support and enable the processes described herein are considered to be well known, and generally not a part of the invention disclosed herein. Accordingly, given the many embodiments and variations of equipment for implementing the teachings herein, discussion of such equipment is generally limited to some of the aspects that may affect generation of the CNT aggregate.

As used herein "aligned CNT aggregate," "CNT aggregate," and other similar terms generally refer to a structure in which a large number of CNTs are aligned or oriented in a common manner. In some embodiments, specific surface area (SA) of the aligned CNT aggregate is not less than 300 m$^2$/g when the CNTs are mostly unopened. In other embodiments, the surface area (SA) is not less than 1,300 m$^2$/g, such as when the CNTs are mostly opened.

In some embodiments, the weight density ($\rho_w$) ranges from 0.002 g/cm$^3$ to 0.2 g/cm$^3$. If the weight density ($\rho_w$) is less than 0.2 g/cm$^3$, there will be a weakening in binding of CNTs constituting the aligned CNT aggregate.

In order for the CNT aggregate to exhibit common orientation and a large specific surface area (SA), the height of the CNT aggregate may be in a range of not less than 10 μm to not greater than 1 cm. A height of not less than 10 μm leads to an improvement in orientation. Alternatively, a height of not greater than 1 cm makes it possible to improve the specific surface area, because such a height makes rapid generation possible and the adhesion of carbonaceous impurities is therefore controlled.

The term "base material" refers to a member that is capable of supporting a catalyst for carbon nanotubes on a surface thereof, and can maintain its shape even at a high temperature (for example, a temperature that is not lower than 400 degrees Celsius). Any type of base material that has been proven to be usable for production of CNTs may be used. Non-limiting examples of materials include: metals such as iron, nickel, chromium, molybdenum, tungsten, titanium, aluminum, manganese, cobalt, copper, silver, gold, platinum, niobium, tantalum, lead, zinc, gallium, germanium, arsenic, indium, phosphor, and antimony; alloys and oxides containing these or other suitable materials; nonmetals such as silicon, quartz, glass, mica, graphite, and diamond; and ceramic. Generally, the metal materials are lower in cost than silicon and ceramic. In particular, a Fe—Cr (iron-chromium) alloy, a Fe—Ni (iron-nickel) alloy, a Fe—Cr—Ni (iron-chromium-nickel) alloy, and the like are suitable. The base material may take the form of a thin film, a block, or a powder, as well as a flat plate. However, in particular, such a form that the base material has a large surface area for its volume is advantageous to mass production.

The term "carburizing prevention layer" generally refers to a layer on the base material. The base material may have a carburizing prevention layer formed on either a front or back surface thereof. In some embodiments, the base material includes a carburizing prevention layer formed on each of the front and back surfaces thereof. The forming may be realized through techniques such as, for example, sputtering. Generally, the carburizing prevention layer is a protecting layer for preventing the base material from being carburized and therefore deformed in the step of generating carbon nanotubes.

In some embodiments, the carburizing prevention layer is composed of a metal or ceramic material (the ceramic material being highly effective in preventing carburizing). Examples of suitable metal include copper and aluminum. Examples of suitable ceramic material include: oxides such as aluminum oxide, silicon oxide, zirconium oxide, magnesium oxide, titanium oxide, silica alumina, chromium oxide, boron oxide, calcium oxide, and zinc oxide; and nitrides such as aluminum nitride and silicon nitride. It is noted that aluminum oxide and silicon oxide are both very effective in preventing carburizing.

As used herein, a "catalyst" is provided on the base material or the carburizing prevention layer. Any type of catalyst that has been proven to be usable for production of CNTs can be used. Non-limiting examples of the catalyst include iron, nickel, cobalt, molybdenum, a chloride thereof, an alloy thereof, and a complex or layer thereof with aluminum, alumina, titania, titanium nitride, or silicon oxide. Other non-limiting examples include an iron-molybdenum thin film, an alumina-iron thin film, an alumina-cobalt thin film, an alumina-iron-molybdenum thin film, an aluminum-iron thin film, and an aluminum-iron-molybdenum thin film. The catalyst can be used in a range of quantities that has been proven to be usable for production of CNTs. For example, in some embodiments making use of iron, a thickness of a film formed may be in a range of not less than 0.1 nm to not greater than 100 nm. In some other embodiments, the thickness of the iron may be not less than 0.5 nm to not greater than 5 nm. In some further embodiments, the thickness of the iron may be 0.8 nm to not greater than 2 nm.

It is possible to apply a dry process to the formation of the catalyst onto the surface of the base material. For example, a sputtering evaporation method may be used. Other techniques such as any one or more of cathodic arc deposition, sputter deposition, ion beam assisted deposition, ion beam induced deposition and electrospray ionization may be used as appropriate. Further, it is possible to form the catalyst into any shape with concomitant use of patterning obtained by applying well-known photolithography, nanoprinting or the like.

In one embodiment, it is possible to arbitrarily control the shape of an aligned CNT aggregate. This may be achieved, for example, according to patterning of the catalyst formed on the substrate and controlling the growth time for CNTs. As a result, the aligned CNT aggregate takes a thin-film shape, a cylindrical shape, a prismatic shape, or any other complicated shape. In particular, in the shape of a thin film, the aligned CNT aggregate has an extremely small thickness (height) as compared with its length and width; however, the length and width can be arbitrarily controlled according to the catalyst patterning, and the thickness can be arbitrarily controlled according to the growth time for CNTs that constitute the aligned CNT aggregate. Accordingly, further techniques for adapting the catalyst are provided herein.

In general, a "reducing gas" is not required by the teachings herein. A reducing gas is commonly used in the prior art to provide for reducing the catalyst. The reducing gas may include any material that is in a gaseous state at a growth temperature. The reducing gas may also be used for stimulating the catalyst to become fine particles suitable for the growth of CNTs as well as to improve the activity of the catalyst. An example of the reducing gas is a gas having reducing ability, such as hydrogen gas, ammonium, water vapor, or a mixture thereof. While the reducing gas is generally used to overcome oxidation, the processes disclosed herein are substantially oxidation free.

A "raw material gas" is generally used to supply raw (i.e., carbonaceous) material for generation of the CNTs. Any type of raw material that has been proven to be usable for production of CNTs can be used. In general, raw-material carbon sources that are gaseous at the growth temperature can be used. Among them, hydrocarbons such as methane, ethane, ethylene, propane, butane, pentane, hexane, heptanepropylene, and acetylene are suitable. In addition, lower alcohols such as methanol and ethanol, acetone, low-carbon oxygen-containing compounds such as carbon monoxide, and mixtures thereof can be used. Further, the raw material gas may be diluted with an inert gas.

"Inert gas" is a gas that may be included in the production processes, and only needs to be a gas that is inert at the temperature at which CNTs grow. Generally, "inert" is considered to be a property of the gas where it does not react substantially with growing of the CNTs. Any type of inert gas that has been proven to be usable for production of CNTs can be used. Non-limiting examples of inert gas are helium, argon, hydrogen, nitrogen, neon, krypton, carbon dioxide, chlorine and mixtures thereof.

A "catalyst activation material" may be used in various embodiments. The addition of the catalyst activation material makes it possible to improve efficiency in the production of carbon nanotubes and the purity of the carbon nanotubes. In general, the catalyst activation material may be characterized as an oxygen-containing substance that does no significant damage to CNTs at the growth temperature. Effective examples other than water include: low-carbon oxygen-containing compounds such as hydrogen sulfide, oxygen, ozone, acidic gases, nitrogen oxide, carbon monoxide, and carbon dioxide; alcohols such as ethanol and methanol; ethers such as tetrahydrofuran; ketones such as acetone; aldehydes; esters; nitrogen oxide; and mixtures of thereof.

In general, the catalyst activation material only needs to be added in small amounts, however, there are no particular limits on amounts to be added. As an example, in some embodiments, when the catalyst activation material is water, the catalyst activation material is added in a range about 10 ppm to about no more than 10,000 ppm, in some of these embodiments in amounts not less than 50 ppm to not greater than 1,000 ppm, and in some of these embodiments in amounts not less than 100 ppm to not greater than 700 ppm.

With the addition of the catalyst activation material, the activity of the catalyst is enhanced and the longevity of the catalyst is extended. When the catalyst activation material is added the growth of CNTs continues for a longer period of time and the growth rate increases as well. As a result, a CNT aggregate with a marked increase in height is obtained.

An "environment of high-carbon concentration" refers to a growth atmosphere in which a proportion of the raw material gas to the total flow is approximately 2% to about 20%. This generally refers to an environment where excess carbon is present, which results in in-efficient growth of the CNTs. That is, for example, an environment of high-carbon concentration may induce deactivation of the catalyst.

Since the activity of the catalyst is improved by the catalyst activation material, the activity of the catalyst will continue even in some environments of high-carbon concentration. Thus, the growth rate of the CNT may be remarkably improved.

With regard to furnace pressure, in various embodiments, the furnace pressure is not lower than $10^2$ Pa and not higher than $10^7$ Pa (100 in atmospheric pressure). In some embodiments, the furnace pressure is not lower than $10^4$ Pa and not higher than $3 \times 10^5$ Pa (3 in atmospheric pressure).

The reaction temperature at which the CNTs are synthesized may be determined with consideration of various parameters, such as properties of the metal catalyst, the raw-material carbon source and the furnace pressure. In embodiments making use of catalyst activation material, the reaction temperature is generally set for a temperature range such that the catalyst activation material will operate adequately.

Specifically, in the case of use of water as the catalyst activation material, it is preferable that the reaction temperature be in a range of 400 degrees Celsius to 1,000 degrees Celsius. At 400 degrees Celsius or lower, the catalyst activation material does not express its effect. At 1,000 degrees Celsius or higher, the catalyst activation material reacts with the CNTs.

Alternatively, in the case of use of carbon dioxide as the catalyst activation material, it is preferable that the reaction temperature be in a range of about 400 degrees Celsius to about 1,100 degrees Celsius. Generally, at a temperature of 400 degrees Celsius or lower, the catalyst activation material does not express its effect. At 1,100 degrees Celsius or higher, the catalyst activation material reacts with the CNTs.

As used herein, the terms "growth step," "deposition step", "CVD" and similar terms refer to a process for synthesizing a CNT aggregate. Generally, this step involves providing an environment surrounding the catalyst that includes a carbonaceous component, such as the raw material gas, and heating at least one of the environment, the raw material gas and the catalyst. This results in the CNT aggregate.

As used herein, a "cooling step" is a step of cooling down the CNT aggregate, the catalyst, and the base material. In some embodiments, the cooling step is performed in the presence of an inert gas. That is, after the growth step, the CNT aggregate, the catalyst, and the base material are high in temperature, and as such, will be oxidized when placed in the presence of oxygen. Oxidation is substantially prevented by cooling down the CNT aggregate, the catalyst, and the base material to a temperature where oxidation processes are substantially limited. In some examples, cessation of cool down is at or below a temperature of about 200 degrees Celsius.

A "load section" (see reference number 11 in FIG. 1) generally includes a set of devices for preventing the outside air from flowing into the production apparatus. That is, in operation, the load section provides components for loading the base material. Generally, the base material is loaded onto a conveyance device. Once loaded, oxygen is expelled from the load section (by at least one of a negative pressure exhaust and a pressurizing with inert gas). In some embodiments, the load section is isolated by at least one of a door, a shutter or other mechanical device.

Once environmental control has been established in the load section (i.e., once the load section is substantially or adequately oxygen-free), the base material is advanced to a catalyst application section (see reference number 12 in FIG. 1). Like the load section, the catalyst application section of the production apparatus is subject to environmental control (i.e., is substantially or adequately oxygen-free). Once the base material is oriented in the catalyst application section, the catalyst is applied to the base material. One embodiment for applying the catalyst includes sputtering the catalyst onto the base material.

Once an adequate layer of catalyst has been applied to the base material (which may include the carburizing prevention layer disposed thereon), a CNT substrate is realized. The substrate may be characterized as a base material having a layer of catalyst material disposed thereon. Advantageously, as the substrate has been produced in a substantially or adequately oxygen-free environment, the catalyst is not subject to any significant oxidation. Thus, the substrate is prepared for growth of the CNT.

Once the substrate has been prepared, in some embodiments, it is moved into a buffer section (see reference number 13 in FIG. 1). In various embodiments, the buffer section provides for at least one of adjusting and changing at least one of pressure, temperature and gas in the environment surrounding the substrate. The buffer section may also provide other functionality, such as loading or reorienting the substrate.

The substrate may then be transferred to a carbon deposition section (see reference number 14 in FIG. 1). The deposition section has a function of synthesizing the CNT aggregate by causing the environment surrounding the catalyst, to be an environment of a raw material gas and by heating at least one of the catalyst and the raw material gas. Specific examples of the deposition section include a furnace in which the environment of the raw material gas is retained, a raw material gas injection section for injecting the raw material gas, and a heater for heating at least one of the catalyst and the raw material gas. The heater may be any type of heater that is capable of heating adequately. In some embodiments, the heater heats to a temperature in a range of between about 400 degrees Celsius and about 1,100 degrees Celsius. Non-limiting examples of the heater include a resistance heater, an infrared heater, and an electromagnetic induction heater.

In some embodiments, the deposition section also includes a sub-section for addition of the catalyst activation material. Generally, the sub-section to add the catalyst activation material is equipped to provide the activation material directly into the raw material gas, or to add the catalyst activation material directly to the environment surrounding the catalyst inside of the deposition section. The catalyst activation material may be supplied in a variety of ways, including by supplying the catalyst activation material through a bubbler, supplying the catalyst activation material by vaporizing a solution containing the catalyst activation material, supplying the catalyst activation material as it is in a gaseous state, and supplying the catalyst activation material by liquefying or vaporizing a solid catalyst activation material. The sub-section may include a supply system using various apparatuses such as at least one of a vaporizer, a mixer, a stirrer, a diluter, a pump, and a compressor. Some embodiments include a device for measuring a concentration of the catalyst activation material in the sub-section. Through feedback and engineering controls, a stable supply of the catalyst activation material can be ensured.

Following growth of the CNT, and while the CNT aggregate remains in a temperature range that is at or about the temperature range used for fabrication, oxidation of the CNT aggregate remains a concern. Accordingly, the CNT aggregate is transferred from the deposition section to a cooling section (see reference number 15 in FIG. 1).

The cooling section provides for cooling down CNT aggregate and the substrate on which the CNT aggregate has grown. The cooling section has a function of exerting anti-oxidant and cooling effects on the CNT aggregate, the catalyst, and the base material after deposition has been completed. Exemplary apparatus for the cooling section include a receiving area for receiving the substrate and CNT aggregate, the receiving area disposed within a volume in which an inert gas is retained. The volume may include, for example, inlets (and outlets) for providing a flow of lower temperature inert gas, at least one cooling conduit disposed in the volume, the cooling conduit for carrying a liquid coolant (such as water) as well as any other similar apparatus suited for conveying a cooling media. Additional apparatus may be included external to the cooling section, such additional apparatus including, for example, at least one heat exchanger that is capable of dissipating heat carried from the cooling unit.

Having thus introduced various components of the production apparatus, certain additional aspects are now discussed.

The fabrication techniques disclosed herein generally do not require the use of a reducing gas. That is, the fabrication techniques result in catalyst materials that are prepared substantially free of oxidation. Accordingly, operation of the production apparatus is generally performed in a manner that limits intrusion of oxygen (such as in the form of ambient air) into the production area. Thus, the various steps discussed herein may be performed in the presence of at least an inert gas (which is provided, among other things, to displace any oxygen).

Thus, the production apparatus may be configured to ensure a relatively oxygen free environment. That is, various engineering controls (many of which are introduced above), may be arranged to ensure maintenance of a desired environment. As in the case of FIG. 1, discussion of FIG. 2 is in a functional format.

Figure 2:
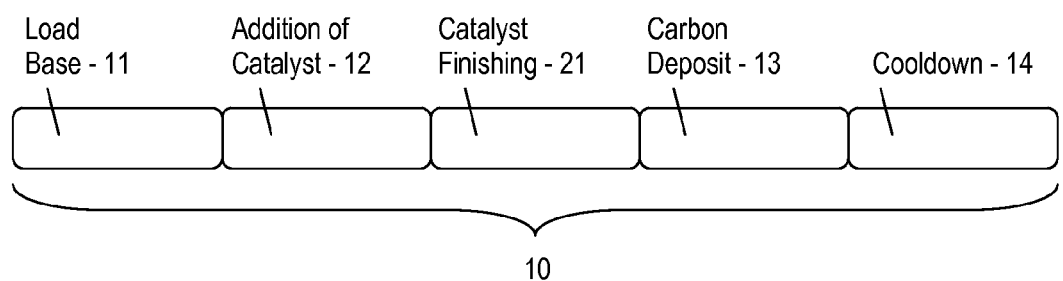
FIG. 2 is a block diagram schematically showing another embodiment of a functional configuration of a production apparatus.

Referring now to FIG. 2, there are shown aspects of an additional embodiment of a production apparatus. In this embodiment, an intermediate step is included. That is, after the second step 12 where the catalyst is disposed onto the base material, and before the third step 13 of FIG. 1, another step 21 is performed. In the another step 21, a plasma is provided. More specifically, the substrate (i.e., the base material with the catalyst disposed thereon) is subjected to a plasma treatment. As with application of the catalyst, the another step 21 is performed without a need for creating a reducing environment, such as by addition of a reducing gas. By controlling the time and power of the plasma, morphology of the catalyst may be adjusted. Specifically, in this step, the plasma may be controlled to result in desired changes to the catalyst. Exemplary changes include modifications to particle size as well as density of particles in the catalyst. Following the another step 21 where surface treatment of the catalyst is performed, the substrate proceeds into the deposition step. Although not depicted in FIG. 2, some embodiments may also include at least one buffer section (as described with regard to FIG. 1).

In general, in the embodiments shown in FIGS. 1 and 2, the process begins and ends with human interaction (for example, loading base material, unloading finished product). However, in other embodiments, additional automated steps or functions may take place.

Figure 3:
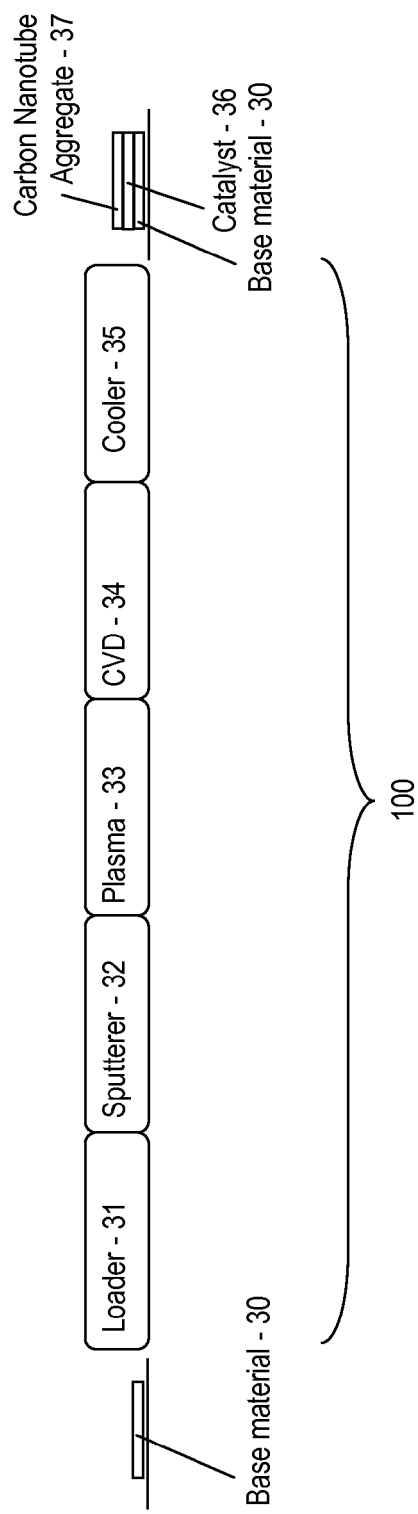
FIG. 3 is a block diagram of aspects of a production apparatus.

FIG. 3 depicts aspects of an embodiment of a production apparatus 100. In this example, the production apparatus 100 includes a loader section 31, a sputterer section 32, a plasma section 33, a chemical vapor deposition (CVD) section 34 and a cooler section 35. During operation, the base material 30 is loaded into the production apparatus via the loader section 31. The base material 30 progresses through the sputterer section 32, the plasma section 33, the chemical vapor deposition (CVD) section 34 and the cooler section 35 on a conveyor-belt to emerge as a finished product. That is, the base material 30 emerges from the production apparatus 100 with a catalyst layer 36 disposed thereon and carbon nanotube aggregate 37 disposed on the catalyst layer 36. In some of these embodiments, the conveyor-belt (not shown) is actually a plurality of conveyor belts, thus permitting fine control over the speed the base material 30 is conveyed through each section (31-35).

Each of the foregoing sections (31-35) may make use of any particular type of equipment that is deemed appropriate, and is only limited by practical considerations such as ability to operate at elevated temperatures. For example, a "gas shower" may be used in the CVD section 34 to provide for uniform dispersion of the carbonaceous material.

In general, the term "gas shower" refers to a volume into which at least one gaseous material is introduced. Generally, the gas shower provides for fulfillment of goals such as, for example, isolation of a first volume in the production apparatus 100 from a second volume in the production apparatus 100 and the like. The gas shower may include a "drain" (i.e., an exhaust). The drain may be at a negative pressure, and adapted for substantially pulling out the at least one gaseous material from the volume of the gas shower. A gas shower may make use of known components to achieve the intended design and/or functionality determined by at least one of a designer, manufacturer and user.

The carbon nanotube aggregate 37 may be harvested in a variety of ways (which are not presented herein). Following the harvesting, in some embodiments, an etching or other process may be used to remove the catalyst layer 36 from the base material 30. The base material 30 may then be suitably prepared and recycled into production.

Figure 4:
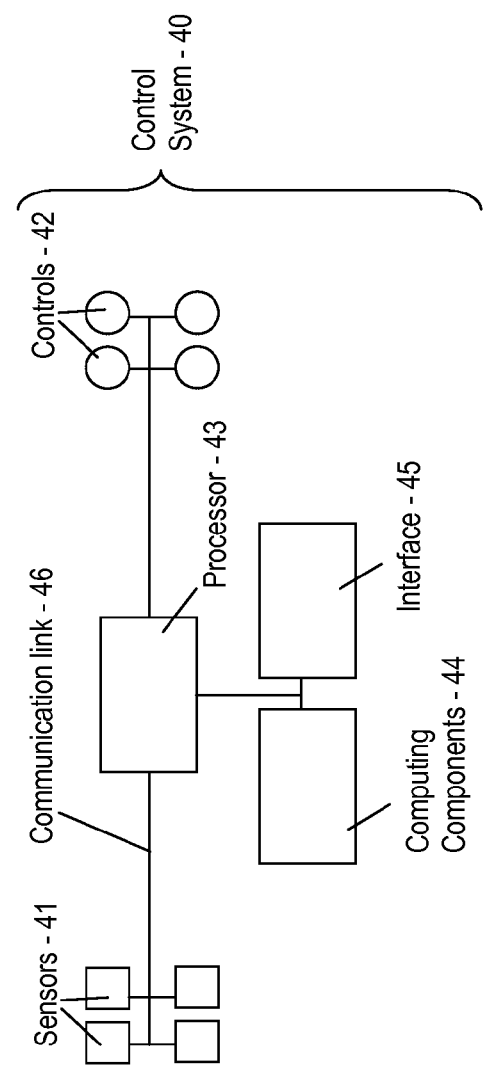
FIG. 4 is a block diagram depicting aspects of a control system for the production apparatus.

Referring now to FIG. 4, aspects of an exemplary control system 40 for the production apparatus are shown. In this example, the control system 40 includes a plurality of sensors 41. The sensors 41 may include apparatus for measuring temperature, gas, feed rate, optical properties and the like. In short, any process dynamic that is useful for controlling the production process. The sensors 41 communicate with at least one processor 43 through a communications link 46. Any type of communications link 46 may be used, including wired and wireless links. The at least one processor 43 in turn communicates with computing components 44 (such as memory, data storage, a power supply, a clock, machine executable program instructions stored on machine readable media in the form of software, and other such components) as well as at least one interface 45. The at least one interface 45 may include a keyboard, a video display, a mouse, a network adapter, a printer and other similar interface components. These components of the control system 40 provide input to controls 42 (such as a servo, a motor, a valve, a heater, a gas supply, an operator and any other type of process control) to modify the production process.

The control system 40 may be used for governing production apparatus 100 such as those of embodiments described herein, as well as other production apparatus. For example, the control system 40 may be used with systems that include a formation unit and a separate growth unit as well as a transfer mechanism. In short, the control system 40 is highly customizable and may be used to control virtually any system designed for fabrication of carbon nanotube aggregate. Aspects that may be controlled by the control system 40 include, without limitation, temperature, flow rate, conveyor speed, processes related to layering (such as layer thickness, control over combinations of materials (such as gases, etc., . . . )) and the like.

As practicable, the control system 40 provides for in-line (i.e., real-time) quality control. By way of example, the control system 40 may include an optical metrology system that measures at least one property of at least one of the catalyst layer 36 and the carbon nanotube aggregate 37. Exemplary properties include thickness, density, surface appearance, etc., . . . . When included in the production apparatus 100, the optical metrology system may provide information to a user or other similar output, so as to ensure adequate layering of materials, early rejection of defective materials, etc., . . . .

Examples of materials for components of the production apparatus 100 include materials capable of resisting high temperatures, such as quartz, heat-resistant ceramic, heat-resistance alloys. However, the heat-resistance alloys are preferable in terms of precision of processing, degree of freedom of processing, and cost. Examples of the heat-resistance alloys include heat-resistant steel, stainless steel, and nickel-based alloys. In general, heat-resistant steel refers to steel that contains Fe in major proportions and other alloys in concentrations of not greater than 50%, and stainless steel refers to steel that contains approximately not less than 12% of Cr. Further, examples of the nickel-based alloys include alloys obtained by adding Mo, Cr, Fe, and the like to Ni. Specifically, SUS 310, Inconel 600, Inconel 601, Inconel 625, Incoloy 800, MC Alloy, Haynes 230 Alloy may be useful in consideration of heat resistance, mechanical strength, chemical stability, and low cost.

The presence of carbon contaminants that adhere to the wall surfaces and other components of the production apparatus when CNTs are synthesized can be reduced by various techniques. That is, by way of example, interior facing components such as the inner walls of the furnaces and/or the components for use in the furnaces are fabricated from a metal, e.g., a heat-resistant alloy and by finishing the interior surfaces. This provides for, among other things, continued production output while limiting deterioration in quality of the resulting aligned CNT aggregates.

For example, in some embodiments, reduction of surface contaminants may be achieved by treatment of components internal to the production apparatus. As an example, internal components may be passivated with silicon. Exemplary techniques for treatment of the internal components are disclosed in various U.S. Patents. A first patent is U.S. Pat. No. 6,444,326, entitled "Surface modification of solid supports through the thermal decomposition and functionalization of silanes." This patent teaches a method of modifying the surface properties of a substrate by depositing a coating of hydrogenated amorphous silicon on the surface of the substrate and functionalizing the coated substrate by exposing the substrate to a binding reagent having at least one unsaturated hydrocarbon group under pressure and elevated temperature for an effective length of time. The hydrogenated amorphous silicon coating is deposited by exposing the substrate to silicon hydride gas under pressure and elevated temperature for an effective length of time.

A second patent is U.S. Pat. No. 6,511,760, entitled "Method of passivating a gas vessel or component of a gas transfer system using a silicon overlay coating." This patent teaches a method of passivating the interior surface of a gas storage vessel to protect the surface against corrosion. The interior surface of the vessel is first dehydrated and then evacuated. A silicon hydride gas is introduced into the vessel. The vessel and silicon hydride gas contained therein are heated and pressurized to decompose the gas. A layer of silicon is deposited on the interior surface of the vessel. The duration of the silicon depositing step is controlled to prevent the formation of silicon dust in the vessel. The vessel is then purged with an inert gas to remove the silicon hydride gas. The vessel is cycled through the silicon depositing step until the entire interior surface of the vessel is covered with a layer of silicon. The vessel is then evacuated and cooled to room temperature.

A third patent is U.S. Pat. No. 7,070,833, entitled "Method for chemical vapor deposition of silicon on to substrates for use in corrosive and vacuum environments." This patent teaches a method of passivating the surface of a substrate to protect the surface against corrosion, the surface effects on a vacuum environment, or both. The substrate surface is placed in a treatment environment and is first dehydrated and then the environment is evacuated. A silicon hydride gas is introduced into the treatment environment, which may be heated prior to the introduction of the gas. The substrate and silicon hydride gas contained therein are heated, if the treatment environment was not already heated prior to the introduction of the gas and pressurized to decompose the gas. A layer of silicon is deposited on the substrate surface. The duration of the silicon depositing step is controlled to prevent the formation of silicon dust in the treatment environment. The substrate is then cooled and held at a cooled temperature to optimize surface conditions for subsequent depositions, and the treatment environment is purged with an inert gas to remove the silicon hydride gas. The substrate is cycled through the silicon depositing step until the surface of the substrate is covered with a layer of silicon. The treatment environment is then evacuated and the substrate cooled to room temperature.

Each of U.S. Pat. Nos. 6,444,326, 6,511,760, and 7,070,833 are incorporated by reference herein in their entirety.

That is, each of these patents teach methods that are suited for treating components exposed to the growth and/or production environments within the production apparatus.

In short, components of the furnace(s) may be passivated or otherwise treated as appropriate in advance of production. These components may be periodically evaluated for ability to limit buildup of contaminants. As appropriate, a user may renew components or replace components to ensure continued performance.

Having disclosed aspects of embodiments of the production apparatus and techniques for fabricating aggregates of carbon nanotubes, it should be recognized that a variety of embodiments of apparatus and methods may be realized. Accordingly, while the invention has been described with reference to exemplary embodiments, it will be understood by those skilled in the art that various changes may be made and equivalents may be substituted for elements thereof without departing from the scope of the invention. For example, steps of fabrication may be adjusted, as well as techniques for layering, materials used and the like. Many modifications will be appreciated by those skilled in the art to adapt a particular arrangement or material to the teachings of the invention without departing from the essential scope thereof. Therefore, it is intended that the invention not be limited to the particular embodiment disclosed as the best mode contemplated for carrying out this invention.

What is claimed is:

1. A method of producing an aggregate of vertically aligned carbon nanotubes, the method comprising:
   (a) loading a base material into a controlled environment;
   (b) disposing a catalyst onto the base material to provide a substrate in an environment having an oxygen concentration low enough to substantially prevent oxidation of the substrate;
   (c) subjecting the substrate to a carbonaceous raw material gas and heating at least one of the raw material gas and the substrate for growing the aggregate onto the substrate without the use of a reducing gas for reducing the catalyst during the growing of the aggregate; and
   (d) cooling the aggregate in an environment having an oxygen concentration low enough to substantially prevent oxidation of the aggregate during the cooling;
   wherein steps (a) to (d) are performed in the controlled environment comprising chambers sequentially connected in a manner that limits the exposure of the base material and any catalyst, substrate, and aggregate disposed thereon to contamination between each step.

2. The method of claim 1, further comprising disposing a carburizing prevention layer on at least one of the base material and the catalyst.

3. The method of claim 1, wherein disposing the catalyst comprises using at least one of sputtering evaporation, cathodic arc deposition, sputter deposition, ion beam assisted deposition, ion beam induced deposition and electrospray ionization.

4. The method of claim 1, further comprising treating the substrate with a plasma.

5. The method of claim 1, further comprising subjecting the substrate to a catalyst activation material during the growing of the aggregate.

6. The method of claim 5, further comprising adding the catalyst activation material to the raw material gas.

7. The method of claim 1, further comprising selecting a production apparatus comprising components treated to limit buildup of contaminants.

8. The method of claim 7, wherein treatment of the components comprises passivating the components with at least one passivation material.

9. The method of claim 8, wherein the passivation material comprises a silicon containing material.

10. The method of claim 1, wherein, during step (c), a surface of the substrate on which the aggregate is grown is exposed to an environment consisting essentially of the raw material gas and one or more inert gases.

11. The method of claim 5, wherein, during step (c), a surface of the substrate on which the aggregate is grown is exposed to an environment consisting essentially of the raw material gas, the catalyst activation material, and one or more inert gases.

12. The method of claim 1, wherein step (a) comprises loading the base material into a load chamber substantially filled with one or more inert gases that substantially displace oxygen from the load chamber.

13. The method of claim 12, further comprising, prior to step (b), transferring the base material to a catalyst application chamber from the load chamber while substantially preventing intrusion of oxygen into the load chamber and the catalyst application chamber.

14. The method of claim 13, further comprising, prior to step (c), transferring the base material to a growth chamber from the catalyst application chamber or a buffer chamber while substantially preventing intrusion of oxygen into any of the load chamber, the catalyst application chamber, and the a buffer chamber.

15. The method of claim 1, wherein, at the commencement of step (c) prior to the growing of the aggregate, the catalyst is substantially oxide free.

16. The method of claim 1 wherein the growing of the aggregate takes place entirely within a single growth chamber, and wherein, prior to the growing of the aggregate, the substrate is free of carbon nanotubes.

17. The method of claim 1, wherein, during the performance of steps (a) to (d), the chambers are sequentially connected in a manner that substantially prevents the exposure of the base material and any catalyst, substrate, and aggregate disposed thereon to room air between each step.

* * * * *